United States Patent
Fisher et al.

(10) Patent No.: US 9,927,682 B2
(45) Date of Patent: Mar. 27, 2018

(54) MINIATURE STABILIZED UNMANNED AERIAL VEHICLE GIMBAL

(71) Applicant: VANTAGE ROBOTICS, LLC, San Francisco, CA (US)

(72) Inventors: Tobin Fisher, San Francisco, CA (US); Johannes Becker Van Niekerk, Livermore, CA (US); Craig Janik, Palo Alto, CA (US)

(73) Assignee: VANTAGE ROBOTICS, LLC, San Francisco, CA (US)

( * ) Notice: Subject to any disclaimer, the term of this patent is extended or adjusted under 35 U.S.C. 154(b) by 0 days.

(21) Appl. No.: 15/087,996

(22) Filed: Mar. 31, 2016

(65) Prior Publication Data

US 2016/0291445 A1    Oct. 6, 2016

Related U.S. Application Data (60) Provisional application No. 62/141,141, filed on Mar. 31, 2015.

(51) Int. Cl.

| | |
|---|---|
| G03B 15/00 | (2006.01) |
| G03B 17/56 | (2006.01) |
| B64D 47/08 | (2006.01) |
| F16M 11/12 | (2006.01) |
| F16M 11/18 | (2006.01) |
| B64C 39/02 | (2006.01) |
| A63H 27/00 | (2006.01) |
| F16M 11/10 | (2006.01) |
| F16M 11/20 | (2006.01) |
| H02P 6/08 | (2016.01) |

(52) U.S. Cl.
CPC .......... *G03B 15/006* (2013.01); *A63H 27/12* (2013.01); *B64C 39/024* (2013.01); *B64D 47/08* (2013.01); *F16M 11/10* (2013.01); *F16M 11/18* (2013.01); *F16M 11/2028* (2013.01); *G03B 17/568* (2013.01); *H02P 6/08* (2013.01); *B64C 2201/127* (2013.01); *F16M 11/125* (2013.01); *G03B 2217/005* (2013.01)

(58) Field of Classification Search
None
See application file for complete search history.

(56) References Cited

U.S. PATENT DOCUMENTS

| | | | | |
|---|---|---|---|---|
| 5,922,039 | A * | 7/1999 | Welch | H01Q 1/18 280/5.507 |
| 5,994,856 | A * | 11/1999 | Menegoli | H02P 6/08 318/400.09 |
| 7,600,929 | B2 * | 10/2009 | Kim | G03B 17/561 348/143 |
| 8,861,947 | B2 * | 10/2014 | Webb | H04N 5/2328 396/421 |
| 2010/0220390 | A1 * | 9/2010 | Wein | F41G 3/22 359/429 |
| 2015/0176752 | A1 * | 6/2015 | Lewis | G03B 17/561 248/550 |

* cited by examiner

*Primary Examiner* — W B Perkey
(74) *Attorney, Agent, or Firm* — Knobbe, Martens, Olson & Bear, LLP (57) ABSTRACT

Embodiments discussed herein provide improved control of an unmanned aerial vehicle camera gimbal. In some embodiments, a linear control circuit is described that uses an operational amplifier that allows the system to retain its passive isolation of high frequency disturbances.

20 Claims, 8 Drawing Sheets

MINIATURE STABILIZED UNMANNED AERIAL VEHICLE GIMBAL

CROSS-REFERENCE TO RELATED APPLICATIONS

This application claims priority to U.S. Provisional Application No. 62/141,141, filed Mar. 31, 2015 and entitled "MECHANICAL ROTARY STABILIZATION OF IMAGE SENSORS," which is hereby incorporated by reference in its entirety.

BACKGROUND

Technical Field

Embodiments disclosed herein relate generally to the mechanical rotary stabilization of image sensors used for taking photographs or video from an aerial vehicle. While the embodiments disclosed herein may be applicable to a wide range of aircraft, certain embodiments may be particularly applicable to multi-rotor unmanned aerial vehicles (UAVs). Certain embodiments are applicable to a wide range of multi-rotor UAVs, but especially designed for quadrotor UAVs.

Description of the Related Art

UAVs are increasingly being used to capture videos and photographs during flight. When capturing videos or photographs (images) it is desirable that the images are free of any undesired motion. Any rotation of the image sensor creates large changes in what is captured within the field of view of the image sensor, resulting in distorted, shaky and blurred images.

When capturing images from a UAV there are rotational movements of the platform, this case the main body of the UAV, to which the image sensor is attached. The UAV must change its angle to maintain its desired position or flight path; these rotational movements are generally large in amplitude and occur at low frequency. There is also vibration from mechanical and aerodynamic forces on the motors and propellers; these rotational movements are generally small in amplitude and occur at high frequency.

A common solution to this problem is to suspend the image sensor on a gimbal. The gimbal platform to which the image sensor is attached is rotated relative to the outer stages of the gimbal which are attached to the UAV.

Many attempts have been made at building low cost UAV gimbals using servo or brushless motors. The servo driven gimbals are generally very slow and inferior in performance to brushless motor gimbals. Brushless motor gimbals are generally driven by switched transistors to control the torque generated by the motor.

In general a brushless motor gimbal does not have sufficient power to drive the system at high frequencies. It is also challenging to sense small amplitude and high frequency movements because of noise in the sensor. It is thus desired to have a system with a low natural frequency to provide passive isolation of the high frequency disturbances. To achieve a low natural frequency the stiffness of the system must be minimized. Adding mass to the stabilized platform also lowers the natural frequency but is undesirable especially for a UAV where minimizing weight and size is important to safety, flight endurance, and flight performance.

SUMMARY

Some innovations relate to a gimbal with a plurality of axes actuated by brushless motors for stabilizing an image sensor, wherein the motors are driven by a high bandwidth operational amplifier circuit.

Some innovations relate to a gimbal with a plurality of axes actuated by brushless motors for stability an image sensor, wherein the motors are driven by a high bandwidth linear drive circuit.

The amplifier component can be an operational amplifier. The amplifier component can be a bi-polar junction transistor. The amplifying means can be a network of bi-polar junction transistors.

Some innovations relate to a gimbal with a plurality of axes actuated by rotational motors for stabilizing a payload requiring precise directional precision, wherein the motors are driven by a high bandwidth linear drive circuit.

Some innovations relate to a gimbal with a single axis actuated by rotational motors stabilizing an image sensor wherein the motor is driven by a high bandwidth linear drive circuit.

DETAILED DESCRIPTION

Hardware

Figure 1:
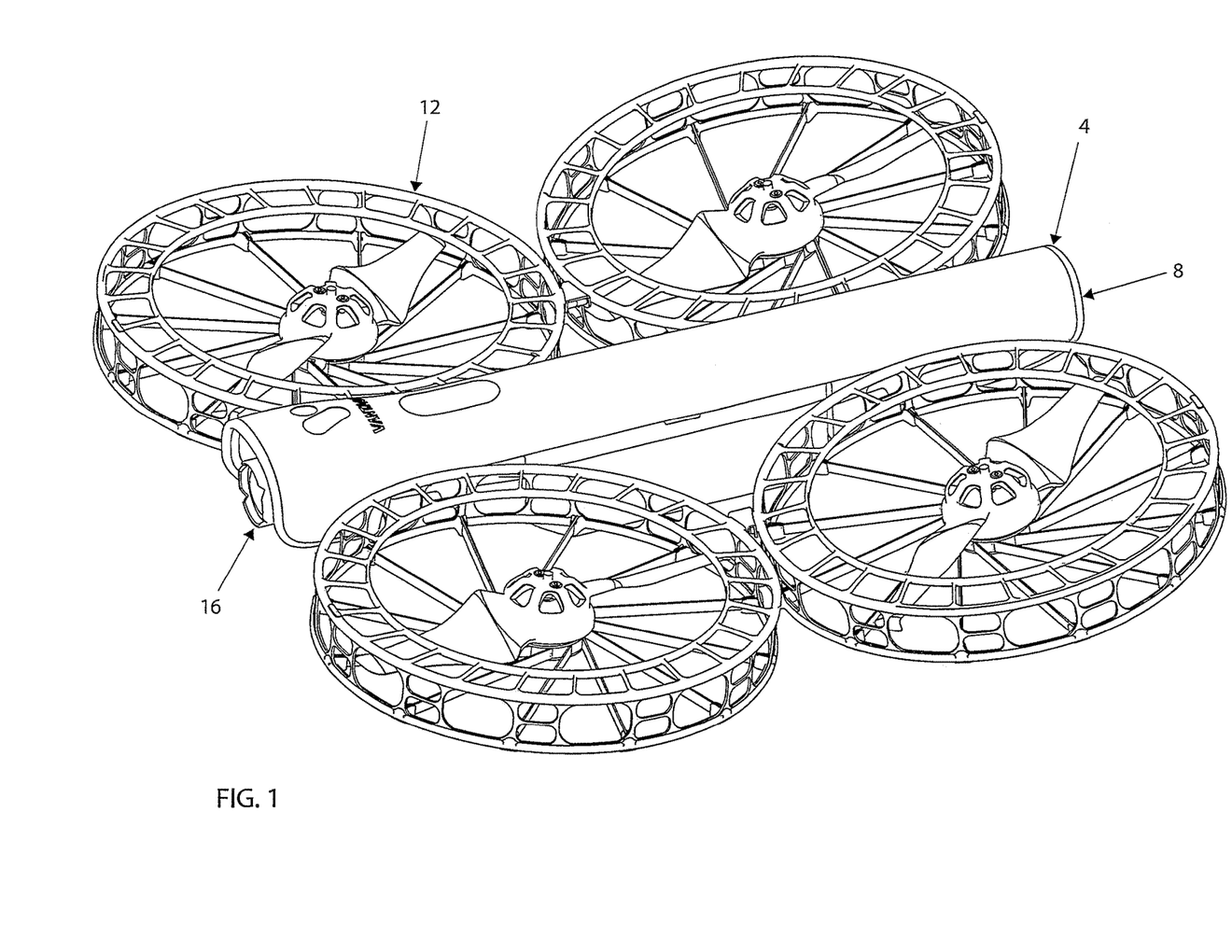
FIG. 1 is an isometric view of an exemplary unmanned aerial vehicle that includes a gimbal.

Referring now to FIG. 1 a UAV 4 is comprised of a fuselage 8, a thrust pod assembly 12, a battery 18, and a gimbal 16. Fuselage 8 and battery 18 each include electronic processing and flight control sub-systems that would be familiar to one skilled in the art of UAV design and will not be described in detail. Likewise the basic composition, components, and function of the thrust pods 12 will not be described in detail.

Figure 2:
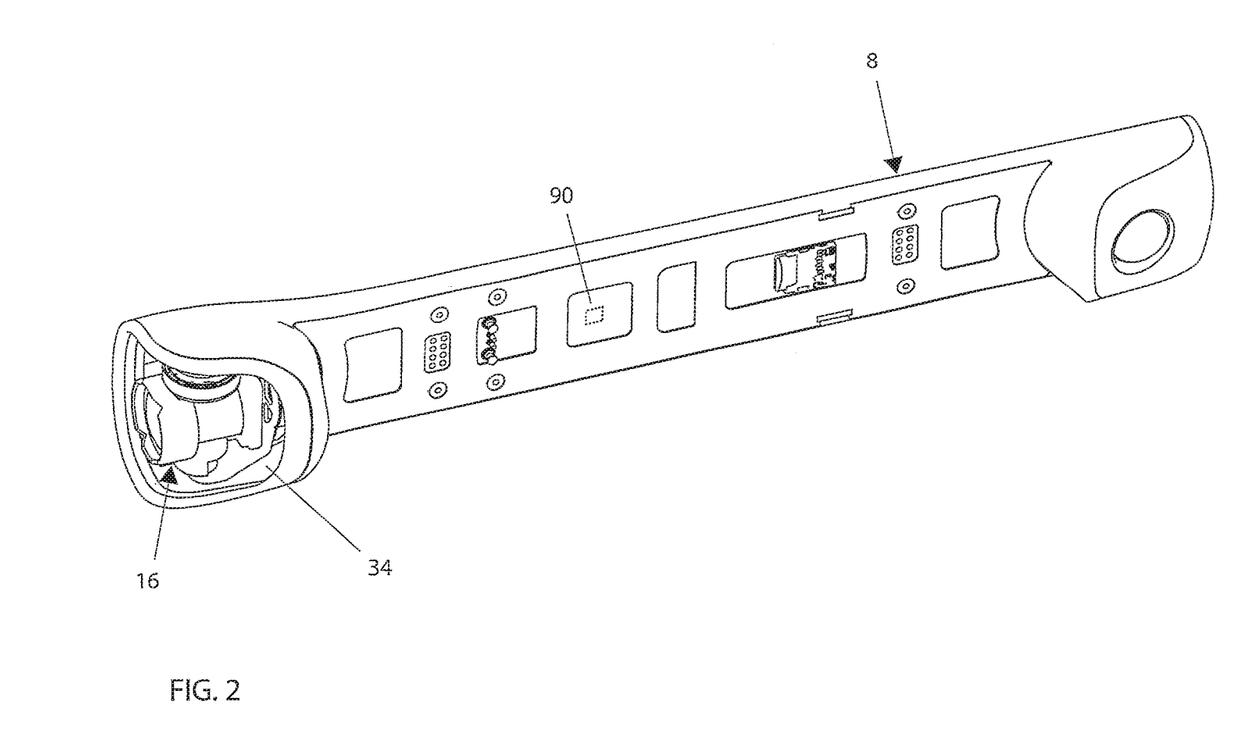
FIG. 2 is a view of bottom side of the fuselage showing location and orientation of a gimbal.

Referring now to FIG. 2, the location and orientation of gimbal 16 in relation to fuselage 8 is shown. A gimbal cavity 34 is a molded concave form integral to fuselage 8 that substantially shields gimbal 16 from impacts with objects or the ground. In another embodiment, an optically clear dome-shaped shield is fastened to the front of fuselage to further protect gimbal 16.

Figure 3:
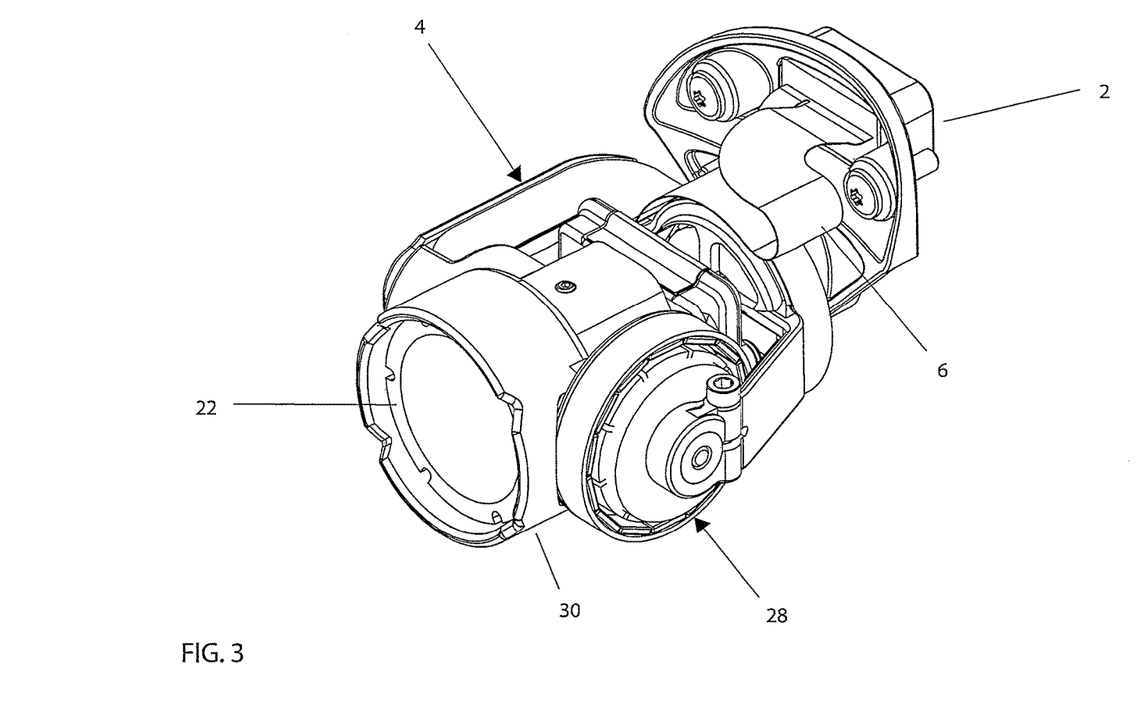
FIG. 3 is a front top isometric view of a 2-axis gimbal.
Figure 4:
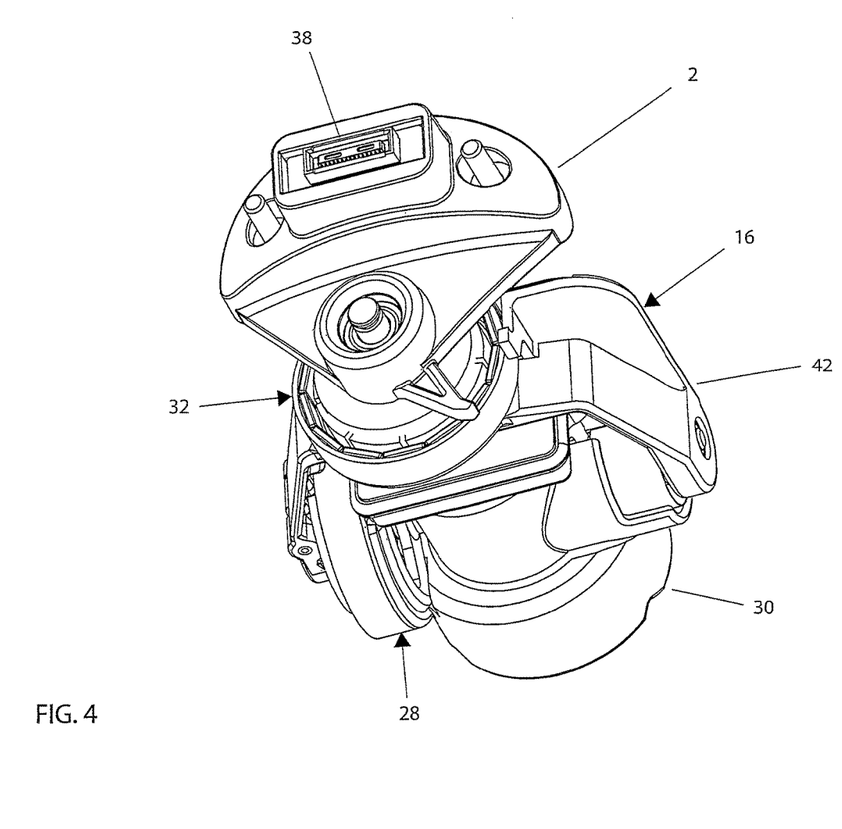
FIG. 4 is a rear bottom isometric view of a 2-axis gimbal.
Figure 5:
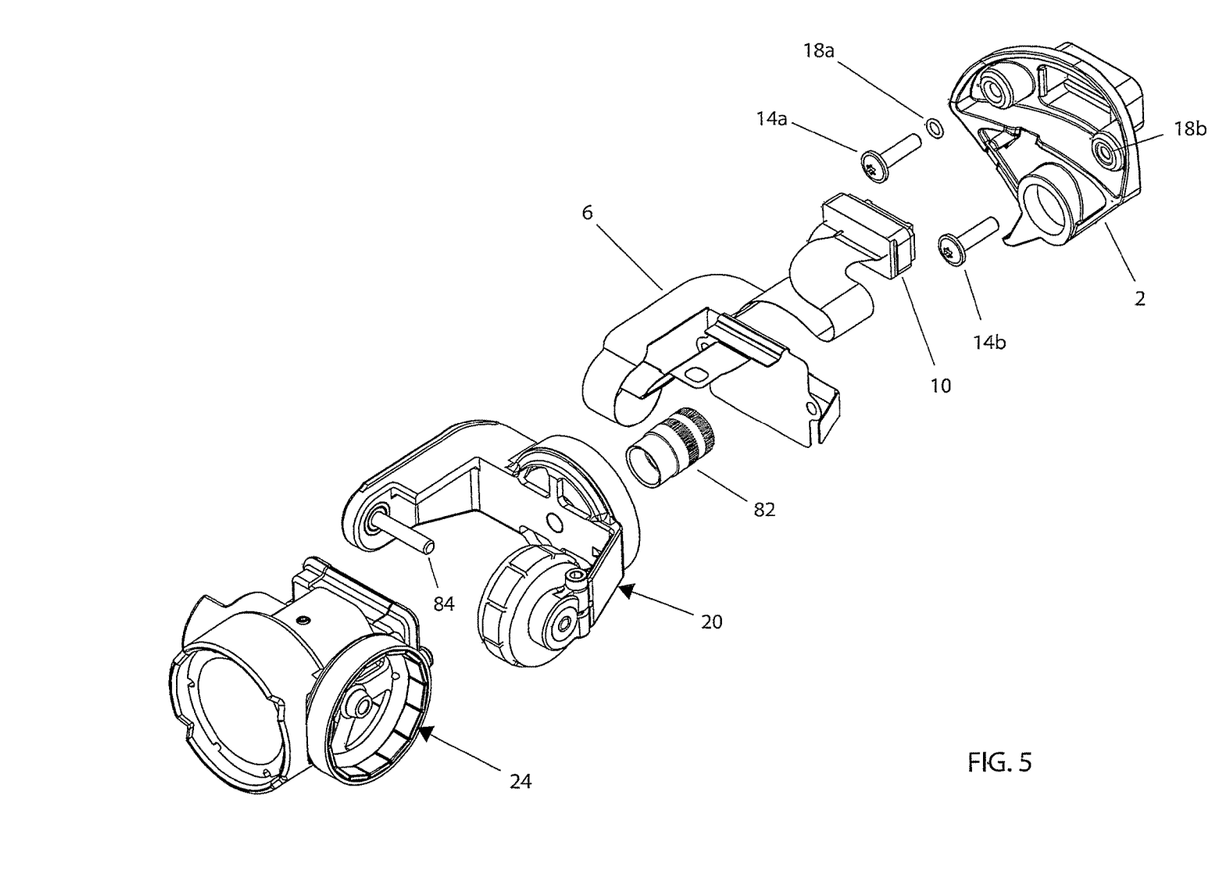
FIG. 5 is an exploded assembly of a 2-axis gimbal.

FIG. 3 shows 2-axis gimbal 16. FIG. 4 shows an exploded assembly view of gimbal 16. A pitch stage sub-assembly 24 is rotationally attached to a roll stage 20 sub-assembly, which is in turn rotationally attached to a gimbal mount 2. The rotation of pitch stage 24 is driven by a pitch stage motor 28 and the rotation of roll stage 20 is driven by a roll stage motor 32.

Gimbal mount 2 is fixedly attached to fuselage 8 with two screws 14a and 14b. Pitch stage 24 rotates about an axis that is parallel to the UAV 4 pitch axis. Roll stage 20 rotates about an axis that is parallel to the UAV 4 roll axis. In one embodiment gimbal mount 2 is comprised of injection molded polycarbonate plastic.

Figure 6:
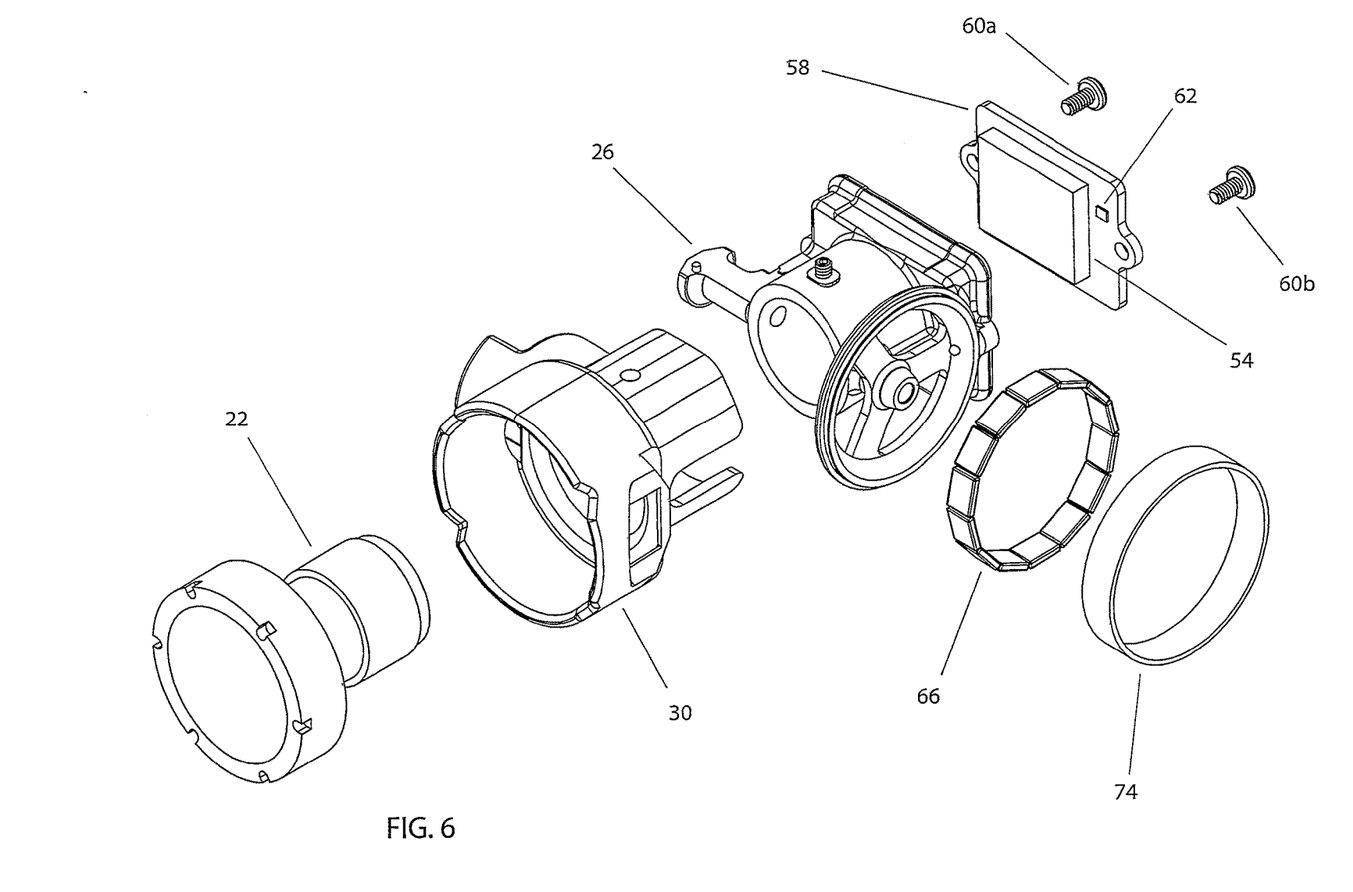
FIG. 6 is an exploded view of the pitch stage sub-assembly.

FIG. 6 shows an exploded assembly view of pitch stage 24. A camera lens 22 includes a threaded portion that screws into a threaded portion of a camera mount 26. A lens guard 30 is retained on camera mount by camera lens 22 and a set screw. Camera mount 26 also includes a circular mounting feature for a pitch stage motor magnet set 66. Note that motor magnet set 66 fixed to camera mount 26 constitutes the function of a rotor in the conventional definition of a DC brushless motor. A pitch stage flux ring 74 is affixed to camera mount 26 surrounding motor magnet set 66. An image sensor rigid printed circuit board 58 is a portion of gimbal flexible circuit board 6, and functionally connects an image sensor 54, and a pitch inertial measurement unit (IMU) 86.

In one embodiment camera lens 22 is part number 123038MPF, manufactured by CCOM Electronics Technology of Fuzhou City, China. Camera mount 26 is CNC machined 6061 aluminum. Lens guard 30 is made from injection molded polycarbonate plastic.

Figure 7:
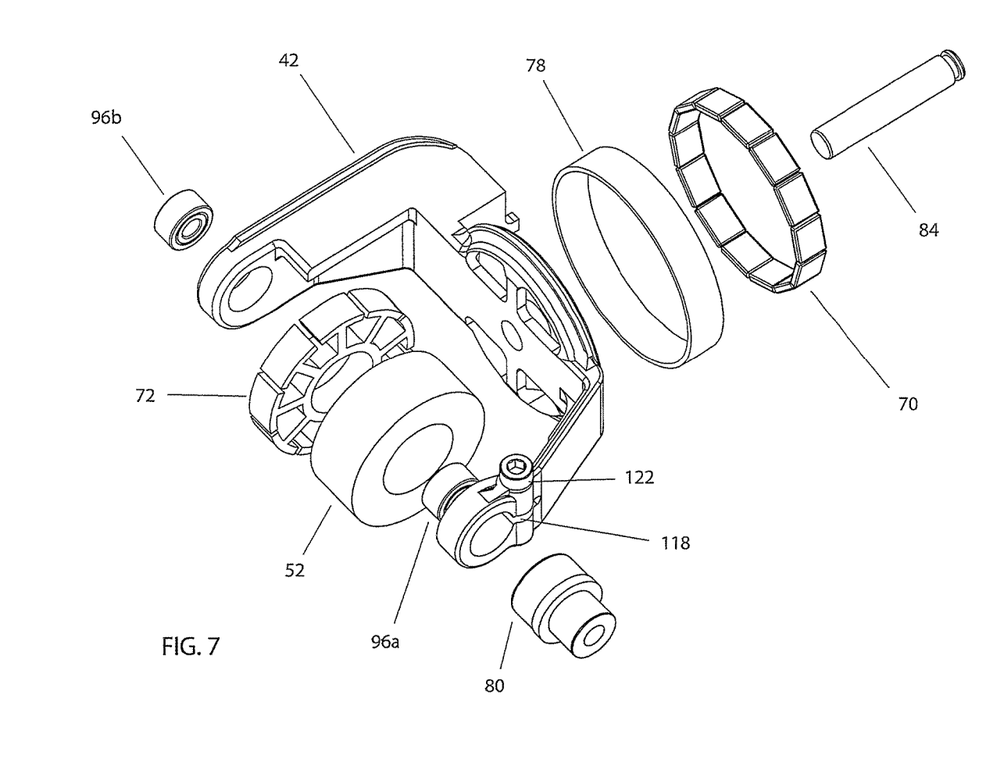
FIG. 7 is an exploded view of the roll stage sub-assembly.

FIG. 7 shows an exploded assembly view of roll stage 20. A roll stator 72 is fixedly attached to a pitch stage insert 80, which in turn is fixedly attached to stage link 42. Bearing 96a and 96b are respectively pressed into stage link 42. Note that the motor magnet set 70 fixed to stage link 42 constitutes the function of a rotor in the conventional definition of a DC brushless motor. In one embodiment stage link 42 is comprised of CNC machined 6061 aluminum.

FIG. 6 shows that stage link 42 includes a pre-load slot 118 that is a machined feature adjacent to the cylindrical surface that mates with pitch stage insert 80. The cylindrical hole is machined with a slightly larger diameter than pitch stage insert 80 mating surface. During assembly, pitch stage insert 80 accepts bearing 96a and is lightly pre-loaded against the mating surface on camera mount 26. Stage link screw is then tightened and due to the slight flexing of stage link in the area of the re-load slot 118. The result is there is no motion of pitch stage 24 along the axis of rotation.

A separate flexible portion of gimbal flexible circuit 6 includes motor drive conductors is routed to and connected to roll stage motor 32, and a separate portion of flexible circuit 6 includes motor drive conductors is routed to and connected to pitch stage motor 28.

Fuselage 8 includes a camera microprocessor 98, a gimbal microcontroller 94, and a platform IMU 90. In one embodiment, camera microprocessor 98 is a model A9 microprocessor, manufactured by Ambarella, Inc., of Sunnyvale, Calif. In one embodiment gimbal controller MCU 94 is model STM32F373C8T6, manufactured by ST Micro of Geneva, Switzerland. In one embodiment pitch IMU 86 and platform IMU 90 are the same component, model number MPU-6050, manufactured by Invensense of San Jose, Calif.

Gimbal flexible circuit board 6 electrically connects image sensor 54 to camera microprocessor 98, and electrically connects pitch stage motor 28 and roll stage motor 32 to gimbal motor control circuit 102. The electrical connections are made through gimbal receptacle connector 38 mated to a corresponding gimbal header connector 114 in fuselage 8. Platform IMU 90 is electrically connected to gimbal MCU 94 inside the fuselage.

Gimbal Function

During operation of UAV 4 when recording video, gimbal 16 is stabilized, that is, gimbal 16 rotates along the pitch axis and roll axis to compensate for UAV 4 platform motion to keep image sensor 54 view vector substantially stable or to steer the view vector. Pitch stage motor 28 and roll stage motor 32 are activated by commands from gimbal controller 94 based on changes in the position of pitch IMU 86 and from platform IMU 90.

Motor Drive Circuit

Figure 8:
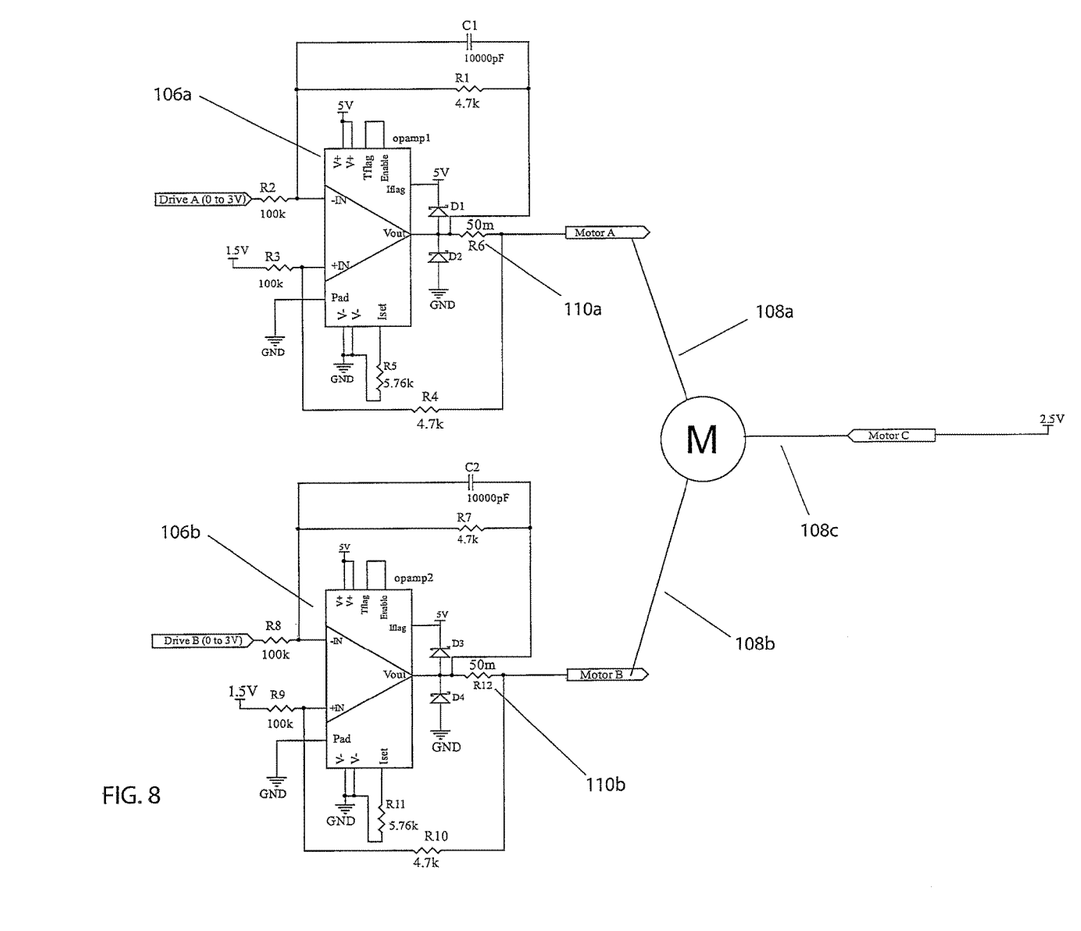
FIG. 8 is a schematic diagram of a motor driver circuit.

Referring now to FIG. 8, in one embodiment, gimbal motor phases are driven by a gimbal motor analog operational amplifier (op-amp) circuit 102 that controls the voltage across each of pitch motor 28 and roll motor 32 phase to produce a desired current in the motor phase 108a, b, and c. The current is measured by the voltage difference across a current sensing resistor 110a in series with motor phase 108a, and across current sensing resistor 110b in series with motor phase 108b. The high bandwidth of each of op-amp 106a and 106b allows the system to retain its passive isolation of high frequency disturbances. For instance, if zero current is desired in pitch motor 28 and the relative motion of pitch motor 28 stator and rotor produce a back EMF voltage, op-amp 106a output is driven to the same voltage and zero current is maintained in motor 28 and neither stiffness nor damping is added to the gimbal 12. Op-amp circuit 102 drives two of the three motor 28 and motor 32 phases. The current in the remaining phase is the sum of these two currents so the third phase does not require an active driver and is driven by a constant voltage.

The following functional description references only pitch motor 28 for the purpose of brevity—it should be understood that the description relates to the function of roll motor 32 also. The desired proportion of currents in motor phases 108a and 108b are calculated by adding or subtracting a 90 degree offset in the electrical angle of motor 28 back-EMF waveform. These proportions of current produce the peak torque for any given current in motor phases 108a and 108b.

The electrical angle of motor 28 is related to the mechanical angle between the rotor and stator by the number of magnetic pole pairs. For a seven pole pair motor, there are seven electrical revolutions for one mechanical revolution. The mechanical angle of motors is calculated using both pitch IMU 86 located on pitch stage 24, and platform IMU 90, located in fuselage 8. The angle may also be directly measured using an encoder, but the mechanical simplicity and absence of added stiffness or friction of the dual IMU solution is favored. Each of pitch IMU 86 and platform IMU 90 run an attitude filter by combining the gyroscope and accelerometer data. The currents in motor 32 are then commanded in the desired proportions based on electrical angle, with a combined magnitude that is proportional to the desired torque in the motor. A feedback control loop calculates the desired motor torque based on the angle and rotational rates of the stabilized IMU.

This embodiment does not include encoders on the pitch and roll axes. Therefore the initial relationship between the initial mechanical and electrical angles is established by an open loop process as follows. An initial control signal corresponding to zero electrical angle is applied to each of motor 28 and motor 32. The electrical angle is then stepped up or down until the desired mechanical angle is reached as measured by the pitch IMU 86. The offset between the electrical and mechanical angle is stored in gimbal controller 94 RAM and used for subsequent control calculations.

In some embodiments, only image sensor 54 and lens 22 are stabilized by gimbal 16 to reduce the size and weight of the system.

Another embodiment includes a third motor with its axis aligned with the vertical axis of the UAV (yaw axis).

In another embodiment the gimbal rotational actuators are voice coils.

In another embodiment, the motor driver circuit includes bi-polar junction transistors.

The gimbal is not required to stabilize an image sensor. In another embodiment, the gimbal stabilizes a laser pointing component.

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A gimbal with a plurality of axes for stabilizing an image sensor, the gimbal comprising:
    a plurality of rotationally positionable motors, each of the plurality of rotationally positionable rotors configured to drive rotation about an axis of the plurality of axes, each of the plurality of motors comprising:
        a stator; and
        a plurality of magnets positioned radially about the stator;
    a first inertial measurement sensor fixed relative to an image sensor;
    a second inertial measurement sensor fixed relative to a fuselage;
    a gimbal control circuit functionally connected to the first inertial measurement sensor and to the second inertial sensor, the plurality of motors configured for control based on input from both the first inertial measurement sensor and the second inertial measurement sensor; and
    a high bandwidth operational amplifier circuit for driving each motor.

2. A gimbal with a plurality of axes for stabilizing an image sensor, comprising:
    a plurality of rotational permanent-magnet motors, each of the plurality of motors configured to induce rotation about one of a plurality of axes;
    a first inertial measurement sensor associated with an image sensor;
    a second inertial measurement sensor associated with a fuselage;
    a control circuit configured to control the plurality of plurality of motors based on input from the first and second inertial measurement sensors; and
    a high bandwidth operational amplifier circuit for driving each motor.

3. An unmanned aerial vehicle (UAV), comprising:
    a fuselage;
    a first inertial measurement sensor associated with the fuselage;
    an image sensor;
    a second inertial measurement sensor associated with the image sensor; and
    a gimbal secured relative to the fuselage and configured to stabilize the image sensor, the gimbal comprising a plurality of motors, each motor configured to induce rotation about one of a plurality of axes;
    a control circuit configured to control the plurality of plurality of motors based on input from the first and second inertial measurement sensors; and
    a high-bandwidth operational amplifier circuit configured to drive the plurality of motors.

4. The UAV of claim 3, wherein the plurality of motors comprises a plurality of permanent-magnet rotational motors.

5. The UAV of claim 3, wherein the fuselage comprises a concave region, and wherein the gimbal is disposed at least partially within the concave region of the fuselage.

6. The UAV of claim 3, wherein the gimbal comprises an optically clear shield, and wherein the gimbal is disposed within the optically clear shield.

7. The UAV of claim 3, wherein the gimbal comprises a two-axis gimbal.

8. The UAV of claim 7, wherein the plurality of motors comprises:
    a pitch stage motor configured to control the rotation of a pitch stage; and
    a roll stage motor configured to control the rotation of a roll stage.

9. The UAV of claim 8, wherein the pitch stage is rotatably coupled to the fuselage, wherein the roll stage is rotatably coupled to the pitch stage, and wherein the image sensor is supported by the roll stage.

10. The UAV of claim 3, wherein the gimbal comprises a three-axis gimbal.

11. The gimbal of claim 2, wherein the gimbal comprises a two-axis gimbal.

12. The gimbal of claim 2, wherein the gimbal comprises a three-axis gimbal.

13. The gimbal of claim 2, wherein the gimbal comprises:
    a first stage rotatably coupled to a gimbal mount, wherein the plurality of motors comprises a first motor configured to control rotation of the first stage relative to the gimbal mount; and
    and a second stage rotatably coupled to the first stage, wherein the plurality of motors further comprises a second motor configured to control rotation of the second stage relative to the first stage.

14. The gimbal of claim 12, wherein the image sensor is supported by the second stage.

15. The gimbal of claim 13, wherein the first inertial measurement sensor is disposed within the fuselage, and wherein the second inertial measurement sensor is supported by the second stage.

16. The gimbal of claim 1, wherein the gimbal comprises a two-axis gimbal.

17. The gimbal of claim 1, wherein the gimbal comprises a three-axis gimbal.

18. The gimbal of claim 1, wherein the gimbal comprises:
    a first stage rotatably coupled to a gimbal mount, wherein the plurality of motors comprises a first motor configured to control rotation of the first stage relative to the gimbal mount; and
    and a second stage rotatably coupled to the first stage, wherein the plurality of motors further comprises a second motor configured to control rotation of the second stage relative to the first stage.

19. The gimbal of claim 18, wherein the image sensor is supported by the second stage.

20. The gimbal of claim 18, wherein at least a portion of the gimbal control circuit is not supported by either the first stage or the second stage.

* * * * *